US005598090A

United States Patent [19]

Baker et al.

[11] Patent Number: 5,598,090

[45] Date of Patent: Jan. 28, 1997

[54] INDUCTIVE JOYSTICK APPARATUS

[75] Inventors: Thomas M. Baker, Peoria, Ill.; George Codina, North Hollywood, Calif.; Larry H. Franzen, Dunlap, Ill.

[73] Assignee: Caterpillar Inc., Peoria, Ill.

[21] Appl. No.: 507,134

[22] Filed: Jul. 31, 1995

[51] Int. Cl.$^6$ .................... H02K 35/00

[52] U.S. Cl. .................... 322/3; 273/148 B; 336/131

[58] Field of Search .................... 322/3; 336/131, 336/136; 273/148 B; 137/554

[56] References Cited

U.S. PATENT DOCUMENTS

| | | | |
|---|---|---|---|
| 4,493,219 | 1/1985 | Sharp et al. | 73/862.05 |
| 4,584,510 | 4/1986 | Hollow | 318/584 |
| 4,654,576 | 3/1987 | Oelsch et al. | 322/3 |
| 4,685,678 | 8/1987 | Frederiksen | 273/148 |
| 4,879,556 | 11/1989 | Duimel | 341/20 |
| 5,008,497 | 4/1991 | Asher | 178/18 |
| 5,293,900 | 3/1994 | Karbassi et al. | 137/554 |
| 5,409,074 | 4/1995 | Wilson et al. | 180/6.5 |
| 5,421,694 | 6/1995 | Baker et al. | 414/694 |
| 5,424,623 | 6/1995 | Allen et al. | 318/568.18 |

OTHER PUBLICATIONS

Patent Application No. 08/347,663, "Capacitive Joystick Apparatus", Filed on Dec. 1, 1994, Thomas M. Baker et al., Docket No. 94-378.

*Primary Examiner*—Thomas M. Dougherty
*Assistant Examiner*—Nicholas Ponomarenko
*Attorney, Agent, or Firm*—David M. Masterson

[57] ABSTRACT

In one aspect of the present invention, a joystick is disclosed. The joystick includes a control shaft and a pivotal mount for the control shaft. A plurality of centering springs bias the control shaft to a neutral position, and extend and contract in response to pivotal movement of the control shaft. An oscillator circuit is coupled to the centering springs and produces an output signal having a frequency responsive to the inductance of the centering springs.

7 Claims, 8 Drawing Sheets

INDUCTIVE JOYSTICK APPARATUS

TECHNICAL FIELD

This invention relates generally to a joystick and, more particularly, to a joystick that uses inductive technology to determine the joystick position.

BACKGROUND ART

In the field of work machines, particularly those machines which perform digging or loading functions such as excavators, backhoe loaders, and front shovels, the work implements are generally manually controlled with two or more operator controls in addition to other machine function controls. The manual control system often includes foot pedals as well as hand operated levers. There are several areas in which these types of implement control schemes can be improved to alleviate operator stress and fatigue resulting from the manipulation of multiple levers and foot pedals. For example, a machine operator is required to possess a relatively high degree of expertise to manipulate and coordinate the multitude of control levers and foot pedals proficiently. To become productive an inexperienced operator requires a long training period to become familiar with the controls and associated functions.

Some manufacturers recognize the disadvantages of having too many control levers and have adapted a two-lever control scheme as the norm. Generally, two vertically mounted joysticks share the task of controlling the linkages (boom, stick, and bucket) of the work implement. For example, Caterpillar excavators employ one joystick for stick and swing control, and another joystick for boom and bucket control. However, the two-lever control scheme presently used in the industry may still be improved to provide for better productivity.

One disadvantage of the joysticks of the above type is the use of contacting switches or resistive potentiometers. However, the use of such switches or potentiometers are subject to wear, necessitating switch replacement or repair. Thus, the long term cost of such joysticks is quite high. Further, when a joystick is not operating properly, the machine cannot be used. This "down-time" greatly adds unacceptable burdens to the machine owner/lessor due to time restrictions on most jobs.

Several attempts have been made to overcome the problems of contact-type joysticks. For example, the non-contacting control-handle discussed in U.S. Pat. No. 4,434,412 and the control signal generator discussed in U.S. Pat. No. 4,654,576 each teach the use of inductive sensors for detecting the displacement of a control shaft from a neutral position. However, such inductive sensors are susceptible to electromagnetic interference, prone to wire breakage, complex to manufacture, and require drive circuitry for operation.

Another type of non-contacting joystick is discussed in U.S. Pat. No. 4,489,303, which teaches the use of Hall effect devices to detect the position of the control shaft from a neutral position. However, Hall effect devices have problems similar to the inductive sensors discussed above. Further, this particular joystick arrangement is limited to detecting only a limited number of discrete positions of the control shaft. For example, a magnet disposed on the control shaft can actuate only one of the Hall effect switches at any particular time. Thus the resulting positional information has poor resolution leading to poor accuracy.

The present invention is directed to overcoming one or more of the problems as set forth above.

DISCLOSURE OF THE INVENTION

In one aspect of the present invention, a joystick is disclosed. The joystick includes a control shaft and a pivotal mount for the control shaft. A plurality of centering springs bias the control shaft to a neutral position, and extend and contract in response to pivotal movement of the control shaft. An oscillator circuit is coupled to the centering springs and produces an output signal having a frequency responsive to the inductance of the centering springs.

BRIEF DESCRIPTION OF THE DRAWINGS

For a better understanding of the present invention, reference may be made to the accompanying drawings in which.

BEST MODE FOR CARRYING OUT THE INVENTION

Figure 1:
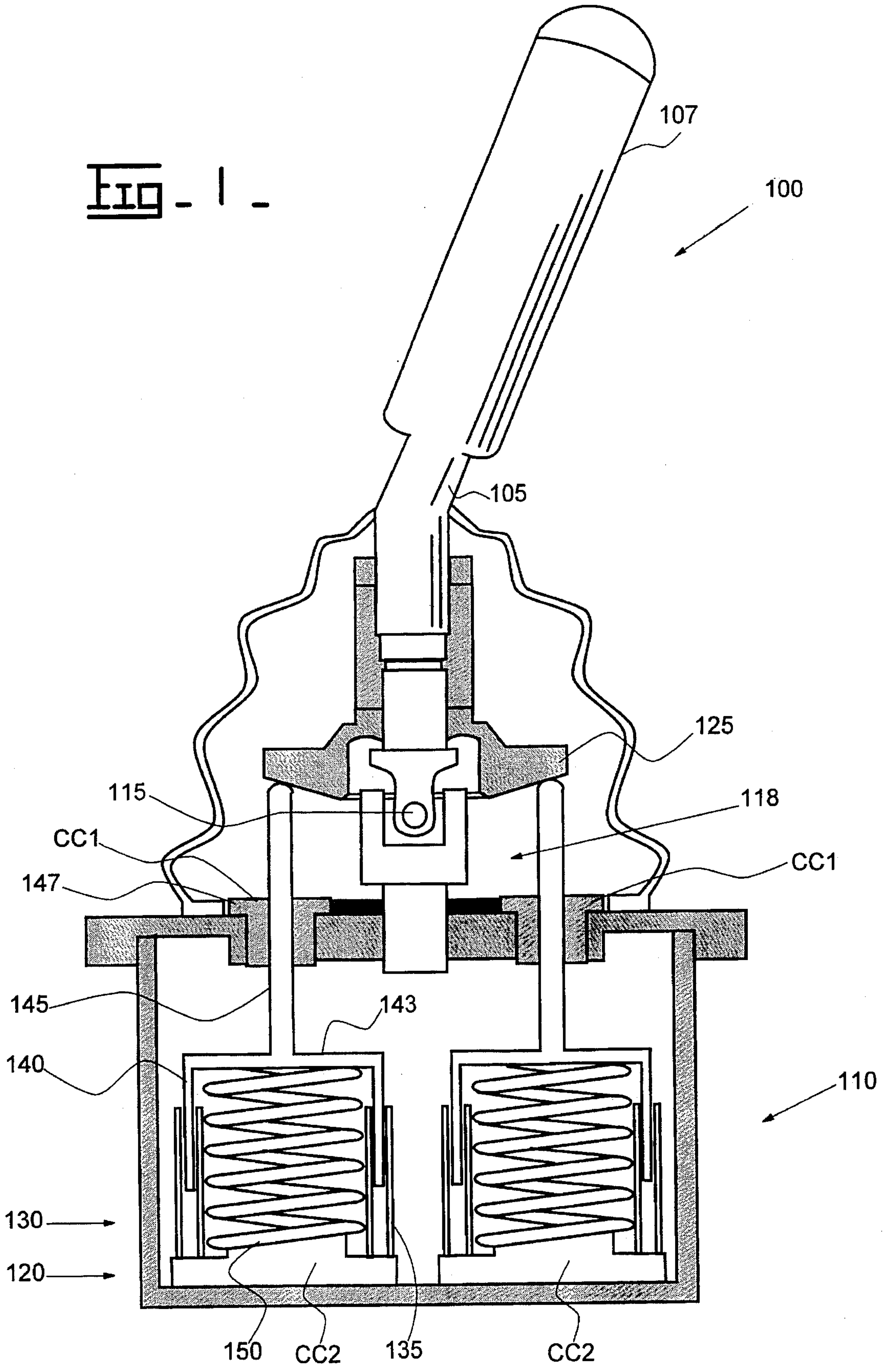
FIG. 1 shows a longitudinal view of one embodiment of a joystick.

Referring now to the drawings, FIG. 1 illustrates one embodiment of a joystick 100. The joystick includes a control shaft 105 having a handle 107, which is universally, pivotally mounted relative to a base portion 110 about a pivotal point 115 in the form of a cardan joint 118. An actuating body 125 in the form of a disk is rigidly attached to the control shaft 105 about the pivot mounting 118. The actuating body 125 has a tapered annular surface on the side facing the base portion 110. A sensor means 120 responds to the pivotal movement of the control shaft 105.

A moveable cylindrical body 140 is disposed in an annular space defined by a fixed cylindrical body 135. The moveable cylindrical body 140 includes a radially extending disk-shaped section 143 and a rod member 145. The disk-shaped section 143 and rod member 145 are integrally formed with the cylindrical portion of the moveable cylindrical body 140. The rod member extends through guide bearings 147 toward the actuating body.

The sensor means 120 is formed by four inductive sensors 130, which are displaced diametrically from one another on the base portion 110. Each sensor 130 includes a retractable spring 150 that is disposed on the cavity of the moveable cylindrical body. Each spring 150 is additionally adapted to bias the rod member against the actuating body. Because the spring dimensions (the number of turns per unit length) change as the control shaft 105 is deflected, the spring 150 is used as a variable inductor in a resonant circuit in order to determine the position of the joystick handle 105.

Figure 2:
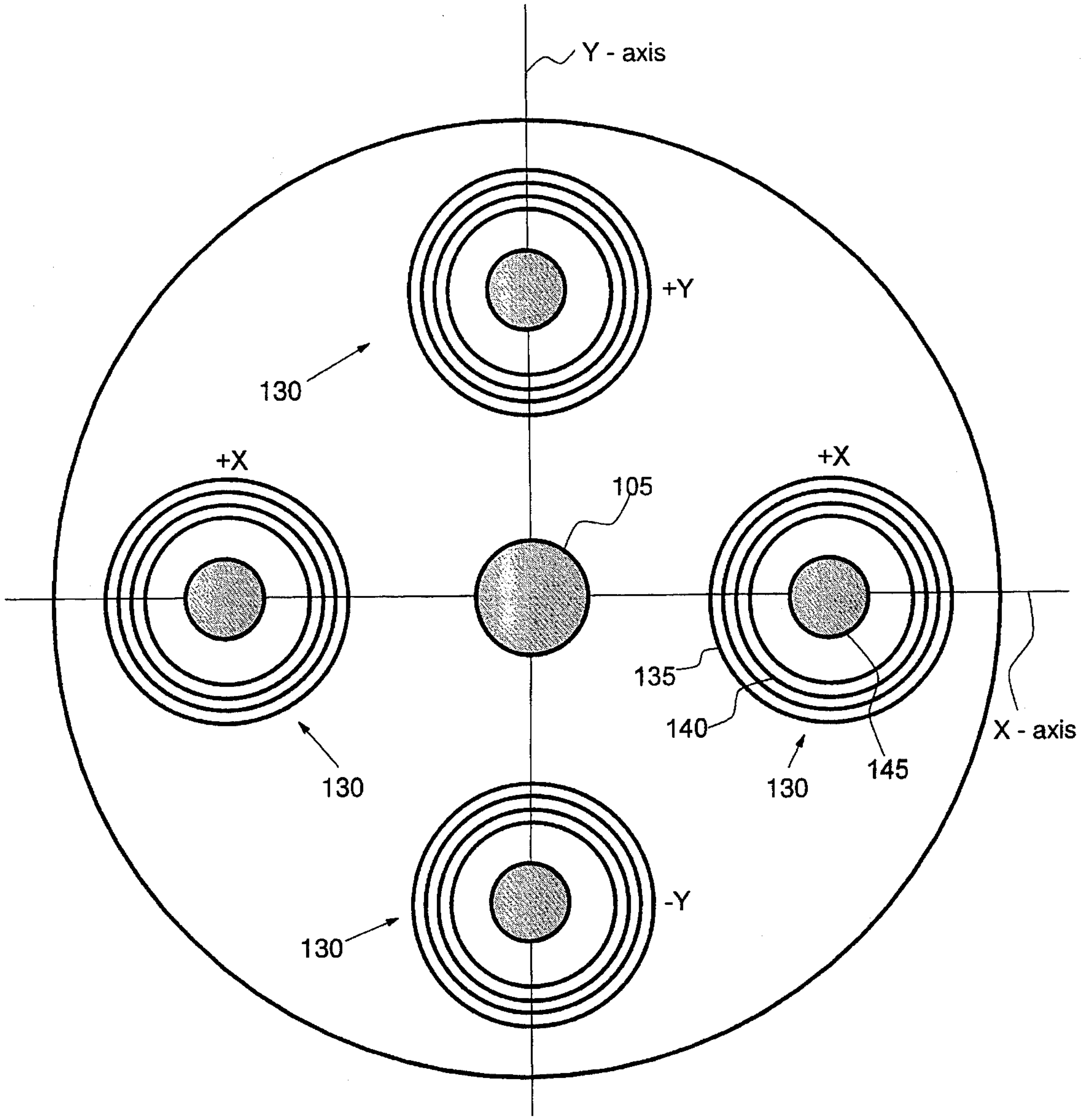
FIG. 2 shows a cross sectional view of the one joystick embodiment taken about a base portion.

As shown in FIG. 2, four sensors 130 are spaced at substantially 90° intervals in a circumferential direction on the base. Accordingly, two sensors correspond to the X-axis and two sensors correspond to the Y-axis. In operation, the actuating body 125 engages the rod member 145, which moves the cylindrical body 140 relative to the fixed body 135 in response to pivotal movement of the control shaft 105. Accordingly, the movement of the cylindrical body 140 varies the dimension of the springs. For example, pivotal movement of the control shaft 105 in the +X direction causes the spring of the +X sensor to contract and the spring of the −X sensor to extend.

The resonant circuit may be attached to each sensor 130 via a set of capacitive couplings which form a "contactless" electrical connection. For example, a first coupling capacitor CC1 is formed between the rod member 145 and the guide bearing 147. The guide bearing 147 may be lined with a dielectric material such as Teflon, for example. The first coupling capacitor CC1 forms a "hi-side" connection to the resonant circuit. A second coupling capacitor CC2 may provided in the form of a metallic annular support. The annular support forms a cavity that is filled with a dielectric material such as a Teflon film or ceramic. The second coupling capacitor CC2 forms a "low-side" connection to the resonant circuit.

Figure 3:
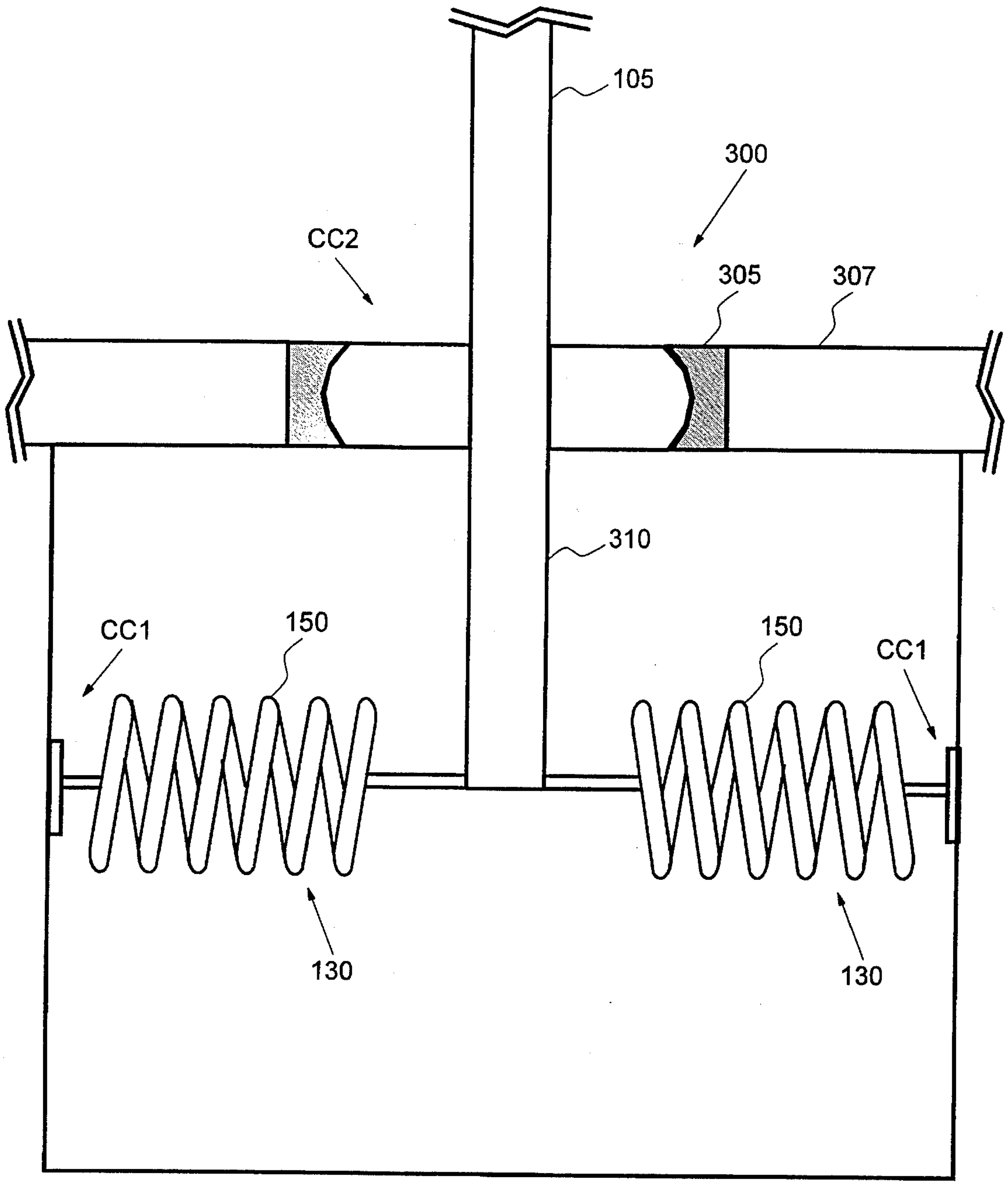
FIG. 3 shows a longitudinal view of another embodiment of the joystick.

Referring to FIG. 3, another embodiment of joystick 100 is shown. A mechanical bearing assembly 300 provides for pivotal movement of the control shaft 105. The mechanical bearing assembly 300 includes a bearing 305, which is "press-fit" into a bearing retainer 307. As shown, a spring pair forms the +X and −X sensors. The springs, on one end, are attached to the inner walls of the joystick housing, and on the other end are attached to each other. A connecting rod 310 extends from the bearing 305 to the common spring connection. The connecting rod 310 is used to vary the dimensions of a spring pair. The embodiment shown in FIG. 3 operates in a similar manner to the embodiment in FIG. 1. For example, as the control shaft 105 moves in a +X direction, the spring associated with the +X sensor contracts, while the spring associated with the −X sensor extends. It is to be understood that, although not shown, two additional springs are included to form the +Y and −Y sensors.

The embodiment of FIG. 3 also includes a capacitive coupling that forms a "contactless" electrical connection. For example, a first coupling capacitor CC1 includes a metallic annular support that is attached to the inner wall of the joystick housing. The metallic annular support forms a cavity that is filled with a dielectric material. The first coupling capacitor CC1 forms the positive connection to the resonant circuit. A second coupling capacitor CC2 is formed between the bearing 305 and the retainer 307. Accordingly, either the bearing and retainer surfaces may be coated with a dielectric material. The second coupling capacitor CC2 forms the negative connection to the resonant circuit.

Figure 4:
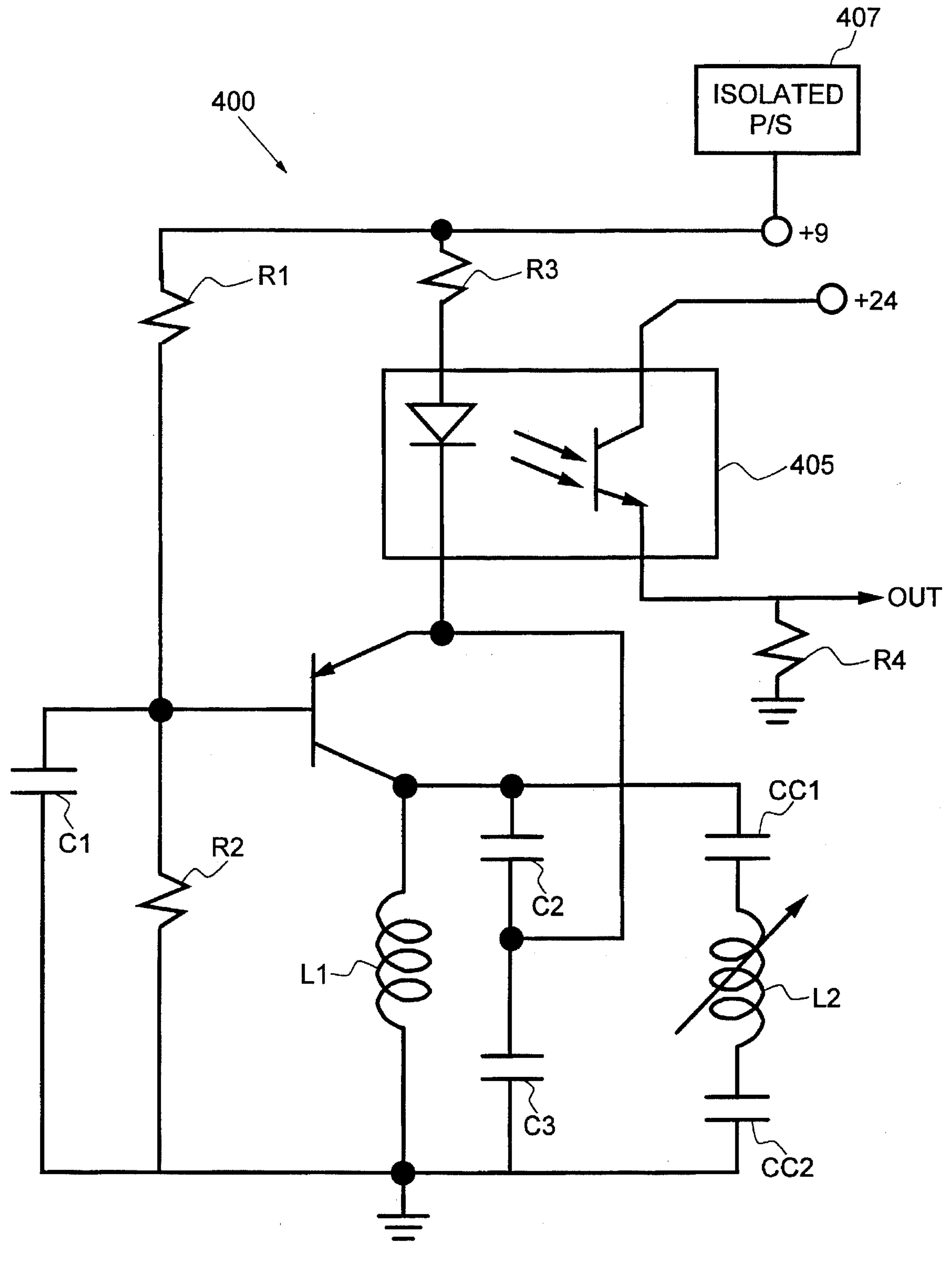
FIG. 4 shows an electrical schematic of an oscillator circuit associated with the joystick.

The resonant circuit will now be described in detail with reference to FIG. 4. As shown, the resonant circuit includes a modified Colpitt's oscillator 400. The Colpitt's oscillator has been modified by the addition of the variable inductor L2 (spring 150), coupling capacitors CC1, CC2, and an opto-coupler 405. The coupling capacitors CC1, CC2 are used to provide a "contactless" connection in order to improve system reliability over that of a direct electrical connection. The opto-coupler 405 and isolated power supply 407 are used to isolate the signal output of the resonant circuit. The resonant circuit produces an output signal having a frequency that is a function of the variable inductor L2. More particularly, the operating frequency of the output signal is described by the following equation:

$$\omega_0 = 2\pi f_0 = \frac{1}{\sqrt{L_{eq} * C_{eq}}}$$

where, $$L_{eq} = \frac{L1 * L2}{L1 + L2}\ ;\ C_{eq} = \frac{C2 * C3}{C2 + C3}$$

Note, it is understood that a single resonant circuit is required for each inductive sensor 130.

Figure 5:
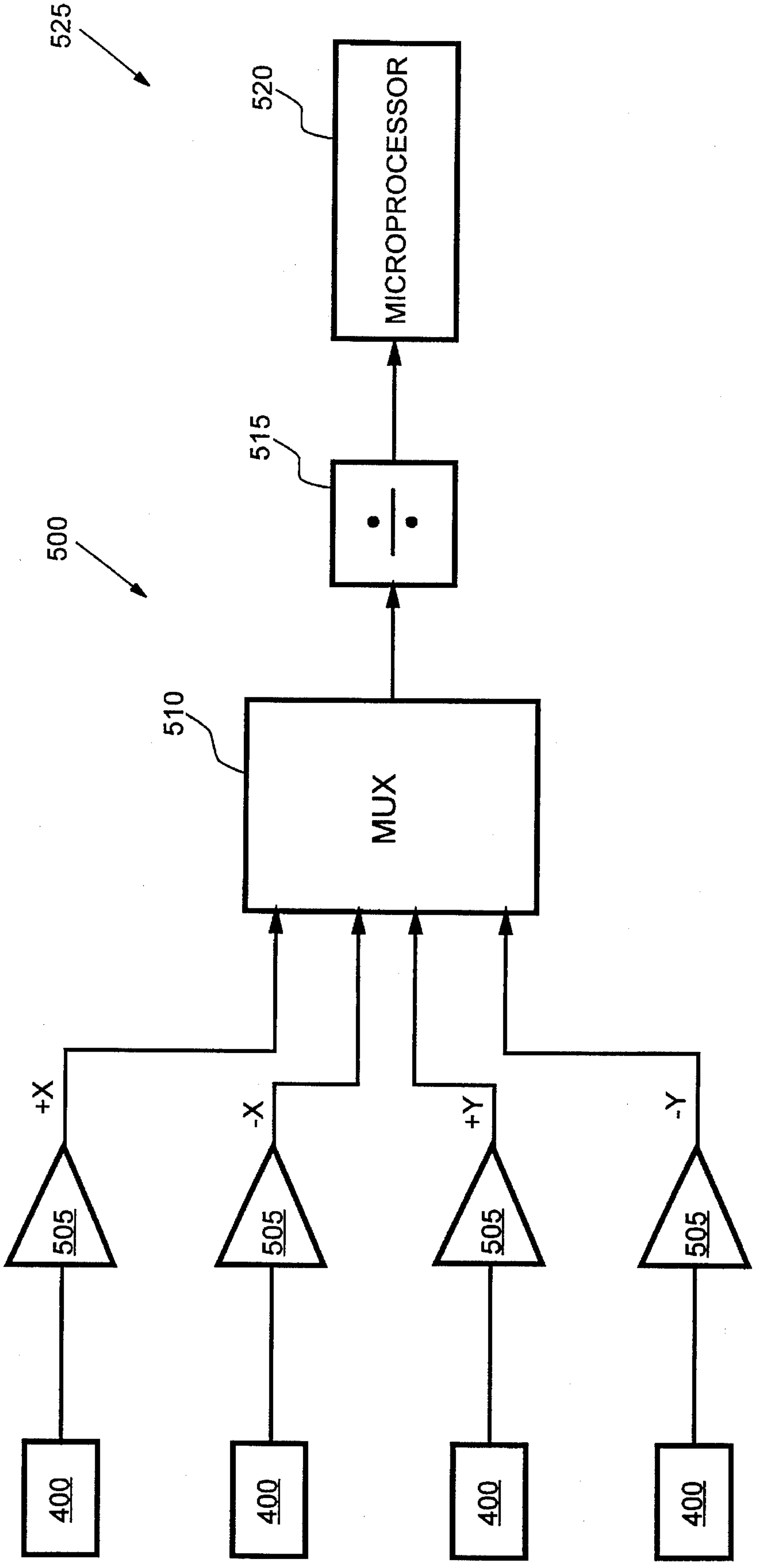
FIG. 5 shows a block diagram of one embodiment of a processing circuit associated with the joystick.

One example of the electronic circuitry 500 that is used to measure the frequency of the resonant circuit 400 is shown in FIG. 5. Each resonant circuit 400 produces an output signal having a frequency that is representative of the inductance value of the respective variable inductor L2. The output signals are processed by a plurality of Schmitt triggers 505 in order to "square" the resulting waveforms. The processed output signals are then delivered to a multiplexer (MUX) to route all the output signals to a control means 525. A "divide-by" counter 420 may additionally be utilized to adjust the resolution of the output lo signal.

Preferably, the control means 525 includes a microprocessor 520. Because the period of each output signal yields information that is representative of the inductance value of the respective variable inductor L2 (or the dimension of the associated spring), the angular orientation of the control shaft 105 may be determined. For example, once the microprocessor 520 has received all the output signals, the microprocessor produces a plurality of position signals that are representative of the angular orientation of the control shaft.

More particularly, the microprocessor selects the +X output signal via MUX 510. The microprocessor then measures the period corresponding to the +X output signal and stores the measured period as CNTX1. Next, the microprocessor measures the period corresponding to the −X output signal and stores the measured period as CNTX2. A differential signal, DIFFX, is then determined by subtracting CNTX2 from CNTX1, viz., $$DIFFX = CNTX1 - CNTX2$$

Advantageously, the microprocessor produces an X-axis position signal having a pulse-width-modulation (PWM) form in response to the magnitude of the DIFFX differential signal. For example, the microprocessor inputs the magnitude of the DIFFX differential signal into a mathematical equation or a look-up table, and determines the proper PWM duty cycle. Accordingly, the duty cycle of the X-axis position signal represents the angular orientation of the control shaft relative to the X-axis.

The microprocessor performs a similar function to produce a Y-axis position signal, where the duty cycle of the Y-axis represents the angular orientation of the control shaft relative to the Y-axis.

Note that, because the angular orientation of the control shaft is based on differential information from at least two sensors, the present invention advantageously compensates for inductive variations common to both sensors, e.g., temperature.

Figure 6:
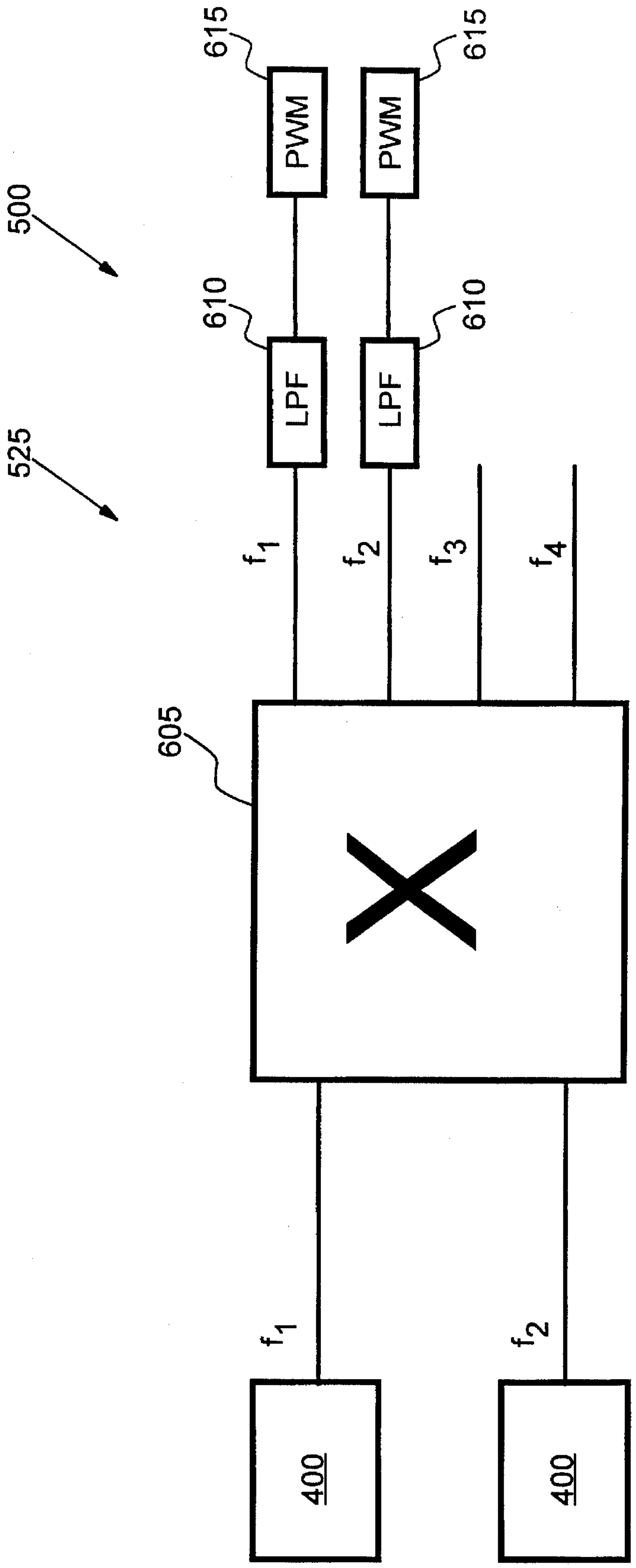
FIG. 6 shows a block diagram of another embodiment of the processing circuit associated with the joystick.

Another example of the electronic circuitry 500 that is used to measure the frequency of the resonant circuit 400 is shown in FIG. 6. Rather than using digital circuitry, the control means 525 of FIG. 6 is implemented with analog circuitry. For example, a heterodyne mixer 605 receives one set of output signals, representative of either the "X or Y axis" and produces four separate signals, $f_1$ (representative of +X output signal), $f_2$ (representative of −X output signal), $f_3$ (representative of $f_1-f_2$), and $f_4$ (representative of $f_1+f_2$). Signals $f_1$ and $f_2$ are filtered via low pass filters 610 and are converted from a frequency modulated form to pulse width modulated form via pulse width modulated circuitry 615. The output signal having the lower frequency indicates the direction of the control shaft movement.

For example, as the control shaft 105 is being moved in the +X direction, the +X spring will contract which increases the inductance of the +X sensor. However, the −X spring will extend which decreases the inductance of the −X sensor. Consequently, the output signal frequency corresponding to the +X decreases, while the output signal frequency corresponding to the −X sensor increases. Once the frequency of the +X output signal falls below a predetermined value, the output signal passes through the low pass filter 610; thereby indicating that the control shaft is being moved in the +X direction. Further, the angular position of the control shaft may be directly calculated in response to the period of the +X output signal.

The difference signal, $f_3$, is used to determine when the control shaft is in the neutral position. For example, a difference signal having a substantially zero frequency indicates that the control shaft is in the neutral position (the +X and −X output signals cancel each other out). Finally, it is noted that a similar circuit shown in FIG. 5 will be required to determine the control shaft movement and position in the other axis.

Thus, while the present invention has been particularly shown and described with reference to the preferred embodiment above, it will be understood by those skilled in the art that various additional embodiments may be contemplated without departing from the spirit and scope of the present invention.

Industrial Applicability

The operation of the present invention is best described in relation to its use in the control of work implements on machines, particularly those machines which perform digging or loading functions such as excavators, backhoe loaders, and front shovels.

Figure 7:
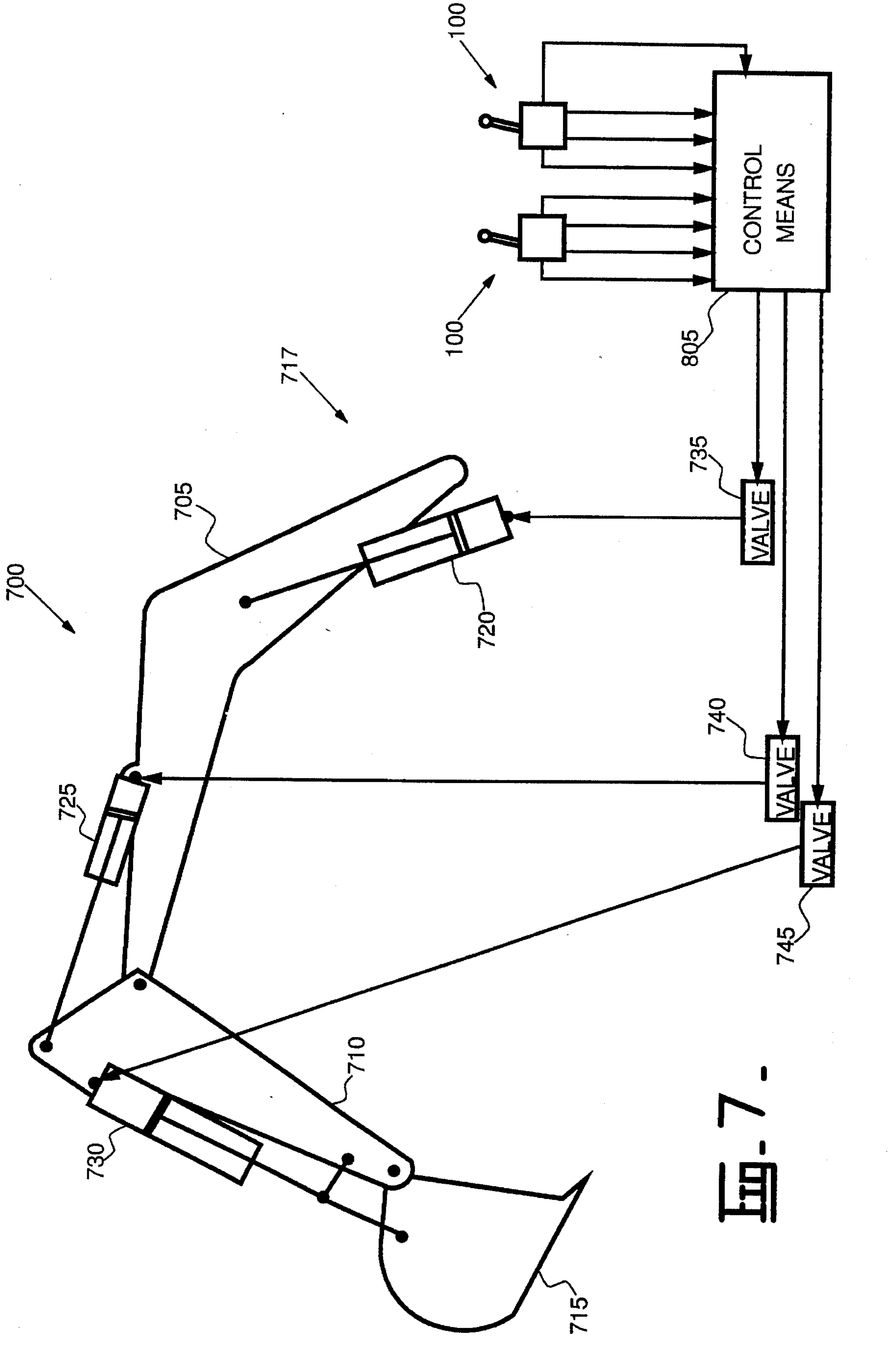
FIG. 7 shows a diagrammatic view of a control system in conjunction with a work implement.

Referring to FIG. 7, a work implement 700 under control typically consists of linkages such as a boom 705, stick 710, and bucket 715. The linkages are actuatable via an actuating means 717. The actuating means 717 may include a hydraulic cylinder, electro-magnetic actuator, piezoelectric actuator, or the like.

The implement configuration may vary from machine to machine. In certain machines, such as the excavator, the work implement is rotatable along a machine center axis. Here, the work implement 700 is generally actuated in a vertical plane, and swingable through a horizontal plane by rotating on a machine platform or swinging at a pivot base on the boom 705. The boom 705 is actuated by two hydraulic cylinders 720 (one of which is shown)enabling raising and lowering of the work implement 700. The stick 710 is drawn inward and outward from the machine by a hydraulic cylinder 725. Another hydraulic cylinder 730 "opens" and "closes" the bucket 715. The hydraulic flow to the hydraulic cylinders are regulated by hydraulic control valves 735, 740, 745.

The operator interface for the control of the work implement 700 consists of two joysticks 100 mounted horizontally and vertically for easy reach on the right and left hand side of the operator seat. Each joystick 100 has "two" axis of movement: for example, pivotal movement in X and Y directions in the X-Y plane. The joystick 100 generates at least one position signal for each respective axis of movement, each signal representing the joystick displacement direction and velocity. The position signals are received by a control means 805, which responsively delivers a plurality of work implement control signals to the hydraulic control valves 735, 740, 745.

Figure 8:
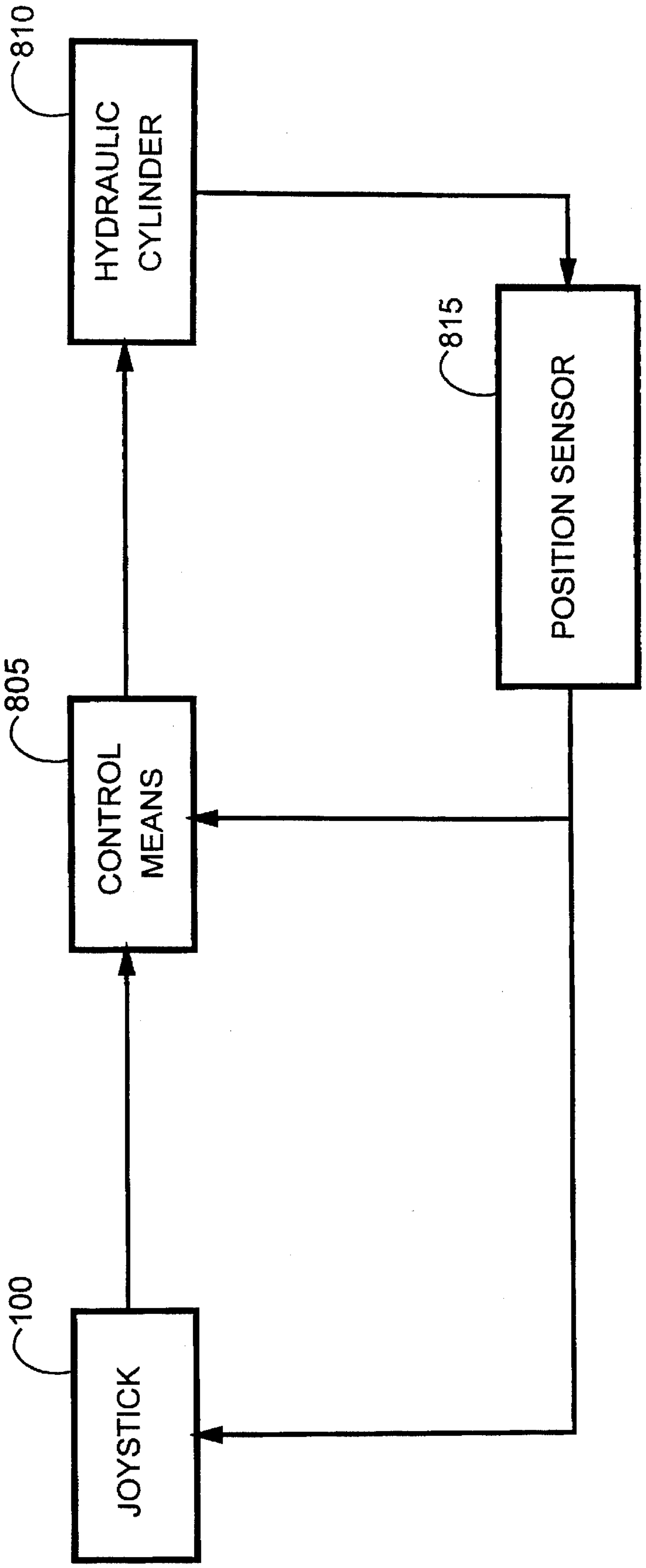
FIG. 8 shows a block diagram of the control system.

For example, the overall control system is shown with reference to FIG. 8, where the joystick 100 delivers the position signals to the control means 805. The position signals are representative of Cartesian coordinates corresponding to the joystick axes of movement. The control means 805 also receives linkages position data from sensors 815 such as linkage angle resolvers or RF cylinder position sensors such as known in the art. The control means 805 may transform the representative Cartesian coordinates into another coordinate system based on the configuration and position of the linkages in a well known manner.

The joysticks 100 control the work implement 700 in the following manner. One joystick 100 produces a first set of position signals that correspond to the horizontal movement of the control shaft 105 along the X-Y plane. The control means 410 receives the first set of position signals and delivers a plurality of work implement control signals to the respective hydraulic cylinders to produce a vertical motion of the boom 705 proportional to the direction of movement of the control shaft 105 along the X-axis. Further, a horizontal motion of the stick 710 is produced proportional to the movement of the control shaft 105 along the Y-axis.

The other joystick 100 produces a second set of position signals corresponding to the horizontal movement of the other joystick control shaft 105 along the X-Y plane. The control means 805 delivers a work implement control signal to the hydraulic cylinder 730 in response to receiving the second set of position signals. This produces a curling motion of the bucket 715 proportional to the magnitude and direction of the movement of the control shaft 105 along the X-axis. Further, the control means 805 produces a plurality of work implement control signals to rotate or swing the work implement 700 proportional to the movement of the control shaft 105 along the Y-axis.

The above discussion primarily pertains to excavator or excavator type machines; however, it may be apparent to those skilled in the art that the present invention is well suited to other types work implement configurations that may or may not be associated with work machines.

Other aspects, objects and advantages of the present invention can be obtained from a study of the drawings, the disclosure and the appended claims.

We claim:

1. A joystick, comprising;

a control shaft;

a base;

means for universally, pivotally mounting the control shaft to the base;

a plurality of centering springs for biasing the control shaft to a neutral position, the centering springs extending and contracting in response to pivotal movement of the control shaft; and an oscillator circuit being coupled to the centering springs for producing an output signal having a frequency responsive to the inductance of the centering springs.

2. A joystick, as set forth in claim 1, wherein each centering spring forms a variable inductor, the inductance value of which varies as a function of the spring dimensions.

3. A joystick, as set forth in claim 2, including at least four centering springs that are spaced at substantially 90° intervals in a circumferential direction about the base portion.

4. A joystick, as set forth in claim 3, including a plurality of capacitors designed integrally with the joystick for coupling the centering springs to a respective oscillating circuit.

5. A joystick, as set forth in claim 4, including a control means for receiving the output signal and determining the pivotal position of the control shaft in response to the frequency of the output signal.

6. A joystick, as set forth in claim 5, wherein the oscillating circuit includes a Colpitts oscillator and the control means includes a microprocessor.

7. A joystick, as set forth in claim 6, including:

an actuating body rigidly attached to the control shaft and adapted, upon pivotal movement of the control shaft from the neutral position, to approach the base on one side and to move away from the base on the other side;

a pair of cylindrical spring retainers corresponding to each spring, one of the spring retainers being fixed and the other being moveable;

a radially extending disk-shaped section formed at the end of the moveable spring retainer;

a rod member rigidly attached to the disk-shaped section, the rod member extending toward the actuating body; and wherein the actuating body engages the rod member thereby moving the moveable spring retainer to change the spring dimensions in response to pivotal movement of the control shaft.

* * * * *